(12) United States Patent
Rametsteiner et al.

(10) Patent No.: US 11,207,844 B2
(45) Date of Patent: Dec. 28, 2021

(54) INDUCTIVE CONNECTING OF PLASTIC OBJECTS BY A COIL ARRANGEMENT WITH MULTIPLE INDIVIDUAL COILS

(71) Applicant: Ke Kelit Kunststoffwerk GmbH, Linz (AT)

(72) Inventors: Karl Rametsteiner, Linz (AT); Urs Hunziker, Meilen (CH)

(73) Assignee: Ke Kelit Kunststoffwerk GmbH, Linz (AT)

( * ) Notice: Subject to any disclaimer, the term of this patent is extended or adjusted under 35 U.S.C. 154(b) by 261 days.

(21) Appl. No.: 16/343,423

(22) PCT Filed: Oct. 20, 2017

(86) PCT No.: PCT/EP2017/076905
§ 371 (c)(1),
(2) Date: Apr. 19, 2019

(87) PCT Pub. No.: WO2018/073436
PCT Pub. Date: Apr. 26, 2018

(65) Prior Publication Data
US 2019/0248079 A1    Aug. 15, 2019

(30) Foreign Application Priority Data

Oct. 20, 2016    (DE) ..................... 10 2016 120 049.2

(51) Int. Cl.
*B29C 65/36*    (2006.01)
*B29C 65/00*    (2006.01)
(Continued)

(52) U.S. Cl.
CPC ...... *B29C 65/3668* (2013.01); *B29C 65/3608* (2013.01); *B29C 65/3612* (2013.01);
(Continued)

(58) Field of Classification Search
CPC ............ B29C 65/3668; B29C 65/5057; B29C 65/4815; B29C 66/73921; B29C 66/1142;
(Continued)

(56) References Cited

U.S. PATENT DOCUMENTS 5,125,690 A * 6/1992 Taylor ..................... B29C 65/18
156/308.2
5,304,767 A * 4/1994 McGaffigan ......... H05B 6/1245
219/674

(Continued)

FOREIGN PATENT DOCUMENTS

DE    3731762 A1    3/1989
EP    0265666 B1    2/1993
(Continued)

OTHER PUBLICATIONS

Wurm, Bernhard, Dr.; Office Action in Application 10 2016 120 049.2; pp. 1-5; dated Feb. 10, 2020; German Patent and Trademark Office, 80297, Munich, Germany.
(Continued)

*Primary Examiner* — Cynthia L Schaller
(74) *Attorney, Agent, or Firm* — Robert A. Blaha; Smith Tempel Blaha LLC (57) ABSTRACT

Described is a heating device for thermally connecting a pipe, which has a first plastic material, to a bushing, which has a second plastic material, and which surrounds at least a section of the pipe, wherein an inductively heatable heating means is located between the pipe and the bushing and/or integrated in the pipe and/or the bushing. The heating device has a coil arrangement, which is excitable by a generator, and which has a first coil, which has at least one complete winding within a first cross-sectional area, and a
(Continued)

second coil, which is electrically coupled to the first coil, and which has at least one complete winding within a second cross-sectional area. The first cross-sectional area is different from the second cross-sectional area. Furthermore, a heating system having such a heating device as well as a method for thermally connecting a pipe to a bushing are described.

18 Claims, 4 Drawing Sheets

(51) Int. Cl.
*F16L 13/007* (2006.01)
*B29C 65/50* (2006.01)
*B29C 65/48* (2006.01)
*F16L 47/03* (2006.01)
*F16L 47/02* (2006.01)
*B29L 23/00* (2006.01)

(52) U.S. Cl.
CPC ...... *B29C 65/3648* (2013.01); *B29C 65/4815* (2013.01); *B29C 65/5021* (2013.01); *B29C 65/5057* (2013.01); *B29C 66/1122* (2013.01); *B29C 66/1142* (2013.01); *B29C 66/30341* (2013.01); *B29C 66/5221* (2013.01); *B29C 66/5229* (2013.01); *B29C 66/52272* (2013.01); *B29C 66/5344* (2013.01); *B29C 66/72321* (2013.01); *B29C 66/73921* (2013.01); *F16L 13/007* (2013.01); *F16L 47/02* (2013.01); *F16L 47/03* (2013.01); *B29C 66/3474* (2013.01); *B29L 2023/22* (2013.01)

(58) Field of Classification Search
CPC .......... B29C 66/52272; B29C 66/5229; B29C 65/3608; B29C 65/5021; B29C 65/3648; B29C 65/3612; B29C 66/1122; B29C 66/30341; B29C 66/5221; B29C 66/5344; B29C 66/72321; B29C 66/3474; B29C 65/36; B29C 65/48; B29C 65/50; F16L 47/03; F16L 47/02; F16L 13/007; B29L 2023/22; H05B 6/10; H05B 6/40

See application file for complete search history.

(56) References Cited

U.S. PATENT DOCUMENTS

| | | | |
|---|---|---|---|
| 5,504,308 A | 4/1996 | Shiozaki | |
| 5,710,413 A | 1/1998 | King et al. | |
| 5,786,575 A * | 7/1998 | Bleske | B23K 13/025 219/633 |
| 2006/0148590 A1 | 7/2006 | Sullivan et al. | |
| 2015/0020977 A1 | 1/2015 | King et al. | |

FOREIGN PATENT DOCUMENTS

| | | |
|---|---|---|
| EP | 2452805 A1 | 5/2012 |
| EP | 2452805 B1 | 6/2015 |
| JP | H0436799 U | 3/1992 |
| JP | H06281079 A | 10/1994 |
| JP | H06285995 A | 10/1994 |
| JP | H07276502 A | 10/1995 |
| JP | H09170692 A | 6/1997 |
| JP | H10278117 A | 10/1998 |
| JP | 2919967 B2 | 7/1999 |
| JP | 2008111459 A | 5/2008 |
| KR | 100180893 B1 | 2/1999 |
| KR | 100260467 B1 | 7/2000 |
| RU | 2153778 C2 | 7/2000 |
| SU | 79929 A1 | 11/1948 |
| SU | 697067 A3 | 11/1979 |
| WO | 9215182 | 9/1992 |
| WO | 9215182 A1 | 9/1992 |
| WO | WO 9215182 A1 | 9/1992 |
| WO | 9723118 A1 | 6/1997 |
| WO | WO 2005019718 A1 | 3/2005 |
| WO | WO 2007128384 A2 | 11/2007 |
| WO | WO 2012137197 A2 | 10/2012 |
| WO | WO 2013106877 A1 | 7/2013 |

OTHER PUBLICATIONS

Fokin, E.V.; Office Action in Application 2019110680; pp. 1-4; dated Feb. 3, 2020; Federal Institute for Industrial Property, Moscow, G-59, GSP-3, 125993. (English translation).

Taillandier, Sylvain; Communication regarding Article 94(3) EPC in Application No. 17787401.3; pp. 1-8; dated May 6, 2020; European Patent Office, 80298, Munich, Germany.

Office Action in Korean Patent Application No. 10-2019-7011377; pp. 1-10; dated Feb. 26, 2021; Korean Patent Office.

\* cited by examiner

INDUCTIVE CONNECTING OF PLASTIC OBJECTS BY A COIL ARRANGEMENT WITH MULTIPLE INDIVIDUAL COILS

CROSS-REFERENCE TO RELATED APPLICATIONS

The present application is a national phase application derived from international patent application no. PCT/EP2017/076905, filed on Oct. 20, 2017, which benefits form the filing date of German patent application no. DE 10 2016 120 049.2, filed Oct. 20, 2016, both applications of which are incorporated herein by reference in their respective entirety.

TECHNICAL FIELD

The present invention relates to the technical field of the thermally connecting two objects made of a plastic material by induction welding. The present invention relates in particular to a heating device, a system as well as a method for thermally connecting (i) a pipe, which has a first plastic material, to (ii) a bushing, which has a second plastic material, and which surrounds at least a section of the pipe, wherein an inductively heatable heating means is located between the pipe and the bushing and/or integrated in the pipe and/or the bushing.

TECHNOLOGICAL BACKGROUND

Objects made of plastic may be thermally connected to each other by inserting an electrically conductive material between the two objects to be connected and by heating the former by an alternating electromagnetic field, which is generated by a specially embodied generator. In the so-called induction welding of plastic objects, an electromagnetic coupling is effected between a magnetic and electrically conductive material and an induction generator substantially via a magnetic field, which is variable in time and which is generated by a coil of the induction generator.

The principle of induction welding is used in particular in the thermal connecting of ends of two plastic pipes by a plastic bushing (or sleeve), which is pushed (or slipped) over the two ends to be welded together. Herein, a magnetic and electrically conductive heating means is introduced between the plastic bushing and the lateral surface of each respective end section of the two pipes to be connected and is heated inductively such that the outer sides of the two end sections as well as the inner side of the plastic bushing are molten on and assume a permanent welding connection during a subsequent cooling down.

A device for thermally welding together of plastic pipes is disclosed for example in WO 2012/137197 A2.

Most induction welding devices for plastic pipes use a coil arrangement, which is placed around the (cylindrical) welding region during a welding process, and which enables a current flow around the whole region. Stated demonstratively, the coil arrangement then represents the primary coil and/or primary winding of a transformer, wherein the used heating means corresponds to the secondary coil and/or the secondary winding of the transformer. This holds in particular in cases, where the heating means extends completely around the inner plastic pipe.

However, a technical problem in induction welding consists at least for some applications in that the induction magnetic field generated by the primary coil penetrates relatively far into the interior of the plastic pipe. Thereby, also metallic structures, which are located in the interior of the plastic pipe, are inductively heated in an undesired manner. Such inner structures are, for example, steel inner pipes of a plastic casing pipe and/or metallic (diffusion) barrier layers, for example aluminium films (or sheets).

Stated demonstratively, the total cross-section of the plastic pipe and in addition the outer region (up to the primary coil) form a zone that is flown through by the induction field. This results in that the welding quality is co-determined very strongly from the material parameters of the materials (in particular ferromagnetic or eddy current absorbing materials) that are present in this region. An undesired absorption of energy by inductively heatable structures in the interior of the plastic pipe cannot be avoided. In this connection it is obvious that an absorption of energy by inductively heatable structures, which are located in the interior of the plastic pipe, reduce both the quality and the energetic efficiency of an inductive welding process.

SUMMARY

There may be a need to improve the induction welding in view of quality and efficiency.

This object is solved by the subjects of the independent patent claims. Preferred embodiments of the present invention are described in the dependent claims.

According to an exemplary embodiment of the invention, there is described a heating device for thermally connecting (i) a pipe, which has a first plastic material, to (ii) a bushing (or sleeve, or pipe collar), which has a second plastic material, and which surrounds at least a section of the pipe, wherein an inductively heatable heating means is located between the pipe and the bushing and/or integrated in the pipe and/or the bushing. The described heating device has a coil arrangement, which is excitable by a generator, and which has a first coil, which has at least one complete winding within a first cross-sectional area, and a second coil, which is electrically coupled to the first coil and which has at least one complete winding in a second cross-sectional area. According to the invention, the first cross-sectional area is different from the second cross-sectional area.

The described heating device is based on the finding that by a division (or partitioning) of the coil arrangement in at least two single coils, an inductive interaction region and/or an inductive interaction area having a predetermined size that may be dependent from the respective concrete welding process, may be provided also in a case, where the individual coils each may have a cross-sectional area, which may be significantly smaller in comparison to one single coil, which may provide an inductive interaction region of similar size. In this connection it may be obvious that for a cylinder coil having a comparably small coil cross-section, the magnetic field lines, which may emerge out of the interior of the coil at both axial sides, may inflect (or form a curve) more strongly, for purposes of the formation of closed magnetic field lines as required by physics, than for a coil having a greater cross-section. From this consideration, there may result directly that in an inductive welding process, in which the individual coils may lie, from the outside, against the outermost of the two plastic objects to be welded together, the magnetic and/or inductive penetration depth may be significantly greater than compared to a case, where a single coil may be used, which may have a comparably large coil cross-section.

OVERVIEW OF EMBODIMENTS

A low magnetic and/or inductive penetration depth may be of advantage in particular in an inductive welding together of plastic pipes, which may have a thin metal layer in the interior not too far away from the surface, which metal layer should not be heated. In this connection, it may also be of significance that such a metal layer may extend typically along the total longitudinal direction of the plastic pipe. Since, in practice, the coil arrangement may never be placed exactly above the mentioned inductive heatable heating means, it may be necessary that the coil arrangement may have a greater longitudinal extension along the axial direction of the plastic pipes to be welded together than the heating means. This may mean that the magnetic alternating field, which may be applied from the outside, may have a greater spatial extension than the heating means. However, this means that there may be no shielding of the magnetic alternating field at least in the region outside of the heating means, such that a low penetration depth may be the only possibility to avoid an undesired heating of such a metal layer. The same may hold of course also for a so-called plastic casing pipe (or tube casing), which may have an internal metal pipe, for example made of steel, and optionally a thermal insulation between the internal metal pipe and the exterior plastic pipe.

It is pointed out that by a suitable construction and/or a suitable geometry of the heating means, the field lines of the individual coils may be formed such that there may be no or only a minimum magnetomotive force (or current linkage) by magnetic field lines in the radial region between the center of the pipe and the heating means. This may mean that in a welding process, there may be no relevant heating of a metallic film (or sheet) or an inner metal pipe. In this relation, it may be of advantage, when the heating means consists of finely distributed ferromagnetic particles, which may be for example embedded in a (plastic) matrix material, in particular for purposes of corrosion protection, and the concentration of which declines in the edge region of the heating means.

The described electrical coupling between the two coils may be effected directly or indirectly, a direct coupling may for example be effected by a common electrical interconnection of the two coils. Herein, it may be possible to feed the total coil arrangement with current using only two electrical connecting wires and/or connecting conduits. An indirect coupling of the two coils may be effected in particular via the mentioned generator. For this purpose, plural connecting wires may be necessary indeed, however, it may be possible to feed the two coils with current independently from each other by a suitable configuration of the generator.

The expression "within a first and/or second cross-sectional area" may be understood in this document in particular to the effect that the at least one complete winding may be mapped into the respective cross-sectional area for a projection along the longitudinal axis and/or symmetry axis of the respective coil. This definition may be of significance in particular when the respective coil has plural (helical) windings and thus a longitudinal extension along its symmetry axis.

The feature "wherein the first cross-sectional area is different from the second cross-sectional area" may enable in particular that, in operation of the described heating device, the two coils may be arranged along the circumferential direction of the bushing at different positions. Thereby, the bushing may be welded together with the plastic pipe not only punctually, but two-dimensionally (or laminarly).

According to an embodiment example of the invention, the first cross-sectional area and the second cross-sectional area may have an overlap. Thereby, the spatial homogeneity of the generated magnetic field may be increased and the quality of an inductive welding may be improved, in an advantageous manner.

It is pointed out that for a high spatial homogeneity, it may not be necessary that the two coils are excited simultaneously. Rather, it may also be possible to excite the first coil within a first time window and the second coil within a second time window. Thereby, the two time windows may be completely different, or alternatively may have a temporal overlap.

It is further pointed out that the described overlap may not be necessary mandatorily: If there are sufficiently many small coils, the penetration depth of the magnetic field may namely be so small that also without overlap of the coils, inhomogeneities of the magnetic field may be compensated by a sufficiently high irradiation energy, without causing a disturbing greater penetration depth.

According to a further embodiment example of the invention, the two coils may be mechanically connected to each other. Thereby, the described coil arrangement may be laid alongside (or mounted) to the bushing and/or placed around the bushing in a simple manner. This may facilitate the handling of the described heating device.

According to a further embodiment example of the invention, the two coils may be mechanically connected flexibly to each other and/or have themselves at least a certain flexibility (or given pliability). This may have the advantage that the described coil arrangement can be bent more or less strongly as a function of the dimensioning of the bushing, in particular of the radius of curvature of the bushing. Thereby, the heating device may be used for welding processes with differently sized bushings.

Stated demonstratively, the coil arrangement may be temporarily laid alongside around the bushing in a simple manner by a suitable subdivision and/or a suitable flexibility of the coils.

According to a further embodiment example of the invention, the two coils may be electrically coupled to each other such that upon an excitation of the coil arrangement, a first magnetic field generated by the first coil may be antiparallel to a second magnetic field generated by the second coil. This may have the advantage that at least for a simultaneous excitation of the two coils, the penetration depth into the interior of the pipe may be reduced particularly strong, because the magnetic field lines, which may be generated by a coil, are canalized spatially and/or bundled in a tight space by the other coil.

It is pointed out that a strict anti-parallelism of the two magnetic fields may be given only in cases, where the two coils are arranged in a common plane or at least parallel to each other with respect to their cross-sectional areas. Also in the case of a slightly tilted relative spatial arrangement of the two coils, which may be given, when the heating device is laid alongside to the outer circumference of the bushing, stated demonstratively, the magnetic field lines, which may emerge out of the first coil in the direction of the plastic pipe, may be "caught" by the second coil, such that the penetration depth of the magnetic field into the interior of the plastic pipe may be reduced to a minimum in an advantageous manner.

The two coils that may be brought together, for example in an array, may be excited counter-polarly in the embodiment example described here. As has been described above, this may result in a minimization of the penetration depth of the magnetic alternating field into the interior of the pipe.

This in turn may prevent in a particularly efficient manner an undesired heating of lower lying ferromagnetic or eddy current producing materials.

According to a further embodiment example of the invention, the first cross-sectional area and/or the second cross-sectional area may be smaller than 1 m², in particular smaller than 1000 cm², and further in particular smaller than 100 cm².

By a subdivisioning of the area to be heated to plural smaller coils, the effect and/or the penetration of the electromagnetic alternating field in the direction towards the center of the pipes to be welded together may be reduced in a simple manner. As has been described above, this may result in an only small undesired heating of the inner pipe also in the case of a plastic casing pipe having an inner pipe, which contains only electrically conducting and/or ferromagnetic materials.

In respect of suitable excitation frequencies it is pointed out at this point that for known coil arrangements having a comparably large coil, the presence of massive metallic structures in the interior of a plastic pipe, and in particular a steel inner pipe of a plastic casing pipe, may result in a high inductivity of the respective coil arrangement. Thereby, an induction welding with a known coil arrangement may be complicated significantly in practice already with middle frequencies in the range of 10 kHz and 400 kHz. An induction welding using higher frequencies may be discarded at least in practice. This limitation with respect to possible excitation frequencies may be overcome by the heating device described here, because (a) due to the described low penetration depth inner metallic structures may not be reached or be reached with only extremely small intensity by the electromagnetic alternating field, and because (b) small individual coils may have already by themselves a comparably low inductivity. Thus, as a function of the respective concrete application, also significantly higher frequencies than 400 kHz may be used for the excitation of the coil arrangement with the described heating device.

According to a further embodiment example of the invention, the first cross-sectional area and/or the second cross-sectional area may have (a) an oval shape and in particular circular shape, (b) a triangular shape and in particular that of a right-angled triangle, or (c) a quadrangular shape and in particular a rectangular shape and further in particular a quadratic shape.

The list of possible forms (or shapes) may not be concluding. However, at present, in particular forms may appear suitable, which may enable a close apposition (or sequencing) of adjacent coils, such that a magnetomotive force may be reached, which may be as homogeneous as possible over the area.

According to a further embodiment example of the invention, the heating device further may have a further coil, which may have at least one complete winding within a further cross-sectional area, wherein the further cross-sectional area may be different from both the first cross-sectional area and also the second cross-sectional area.

By an increase of the number of individual coils, a spatial electromagnetic interaction region between the described heating device and a heating means may be increased. The individual coils may be arranged in a one-dimensional or a two-dimensional array. The coil arrangement of the heating device may in particular have a length such that the arrangement can be laid alongside around the whole bushing, and thus a spatially particular homogeneous welding together may be ensured.

In this connection, it is pointed out that the width of the coil arrangement and/or the width of the two-dimensional array along a direction parallel to the axis of the pipe to be welded together should be so large, that the heating means may be heated along its entire width also when the heating means may be placed not in the center along the axial direction with respect to the coil arrangement.

The further coil may have the same features as the first coil and/or the second coil.

According to a further embodiment example of the invention, the coils may be interconnected with each other serially and/or parallelly. This may have the advantage, that the coil arrangement can be excited electrically via only two connecting wires.

By a suitable combination of one or plural serial connection(s) and parallel connection(s), the spatial characteristics and in particular the spatially possibly varying intensity of the electromagnetic field may be adapted to the respective welding application in a simple manner. As has been mentioned already above, in particular, an electromagnetic alternating field may be built, which may surround the bushing and/or the pipe, and for which the penetration depth is minimum. Stated demonstratively, the penetration depth may become the smaller, the more individual coils may be used and/or the smaller the individual coils may be (in order to cover the same base area).

According to a further embodiment example of the invention, the coil arrangement may further have at least one outer coil, which may be arranged above the first coil and/or above the second coil, wherein in particular a cross-sectional area of the outer coil in a plane parallel to the plane of the first cross-sectional area and/or parallel to the plane of the second cross-sectional area may be offset with respect to the first cross-sectional area and/or with respect to the second cross-sectional area. This may have the advantage that the homogeneity of the magnetomotive force that may be generatable by the whole coil arrangement can be improved further. This may result in particular in a homogeneous warming up of the heating means, and thus to qualitatively particularly good welded connections.

Also, at this point, it is noted that for a qualitatively high-quality welded connection it may not be mandatorily necessary that the magnetomotive force is homogeneous during a defined time period. Rather, it may also be possible to excite different coils at different times, such that a homogeneous magnetomotive force of the heating means may be effected in an integrated way over a longer time period.

In preferred embodiments, (at least) two coil arrays may be stacked one upon the other spatially offset to each other, and may be fed with current at different times. In this way, the transition regions (non-field-flooded island regions) may be warmed up by a coil array having a plurality of coils also between the coils. A non-simultaneous excitation of the different coil arrays and/or coil planes may prevent in a simple manner a mutual influencing of the coil arrays and a possible distortion of the electromagnetic fields by such an influencing.

The expression "above" may be understood in particular such that the (at least one) outer coil is located, in the application of the heating device, in a radial direction outside of the first coil and/or the second coil.

According to a further embodiment example of the invention, the heating device may further have a capacitive element, which, together with the coil arrangement, may form an oscillator circuit.

By a measurement of the resonance frequency of the mentioned oscillator circuit, conclusions on the actual inductivity of the coil arrangement may be obtained in a simple and effective manner already during an inductive welding process or directly before an inductive welding process. The electrical properties of a heating means, such as e.g. the capability to form eddy currents and/or the ferromagnetic properties, namely may change the inductivity of the respective coil, and thus of the whole coil arrangement. Thereby, for example, the correct laying alongside of the coil arrangement around the pipe may be monitored.

Since, as a rule, the electrical and/or magnetic properties of the heating means may be temperature-dependent, conclusions on the actual temperature of the heating means and/or the reaching of a predetermined temperature of the heating means may be obtained by the measurement of the resonance frequency and/or by a measurement of a shifting of the resonance frequency. The resonance frequency and/or a shifting of the resonance frequency may be sensed by an arbitrary frequency measurement device. A frequency measurement device may for example be integrated in the above-mentioned generator.

A particularly significant change of the resonance frequency upon a temperature change of the heating means can be ensured, when the heating means may have a ferromagnetic material having a Curie temperature, which may not yet be reached at the beginning of an inductive welding process, may be however reached at least approximately in the course and/or towards the end of a welding process. In connection with a heating means, which may have a material having a suitable Curie temperature for the respective application case, a highly sensitive temperature control of the inductive welding process may thus be realized.

In a further embodiment, the change of the magnetic properties of non-ferromagnetic materials may be measured. Herein, a reaching of a Neel temperature may provide for that in particular the heating means may lose certain magnetic properties. Also, this may be monitored by a measurement of the resonance frequency, and on this basis, the inductive welding process may be controlled in a suitable manner.

According to a further exemplary embodiment of the invention, there is described a heating system for thermally connecting (i) a pipe, which has a first plastic material, to (ii) a bushing, which has a second plastic material, and which surrounds at least a section of the pipe, wherein an inductively heatable heating means is located between the pipe and the bushing and/or integrated in the pipe and/or the bushing. The heating system has (a) a heating device of the type described above, and (b) the generator for exciting, and in particular for feeding with current, of the coil arrangement.

The described heating system is based on the finding that a feeding with current of the above-described coil arrangement as induced by a generator, an inductive welding process can be performed, wherein the necessary electromagnetic interaction region may be limited in respect of its depth, i.e. in respect of its spatial extension perpendicular to the respective coil cross-sectional area, to the effect that, on the one hand, the heating means may be heated well, and, on the other hand, deep lying inductively heatable structures may not be heated. Thereby, a particularly high efficiency of the welding process may be ensured, and at the same time an undesired thermal damage of, as the case may be, metallic structures present within the pipe may be prevented.

According to a further exemplary embodiment of the invention, there is described a method for thermally connecting (i) a pipe, which has a first plastic material, to (ii) a bushing, which has a second plastic material, and which surrounds at least a section of the pipe, wherein an inductively heatable heating means is located between the pipe and the bushing and/or integrated in the pipe and/or the bushing. The method has (a) a laying alongside of a heating device of the type described above from the outside to the bushing; (b) an exciting of the coil arrangement; and (c) a removing of the heating device from the bushing.

The described method is based on the finding that by the use of the above-described heating device, a particularly high efficiency of the welding process can be ensured, and at the same time an undesired thermal damage of, as the case may be, metallic structures present within the pipe can be prevented.

The exciting may be effected typically during a predefined time period, which may be so long that a sufficient quantity of plastic material of the pipe and/or of the bushing melts on, so that a stable mechanical connection between the pipe and the bushing may be effected after a cooling down of the same. In order to ensure a mechanical connection that may be as stable as possible, a heating means may be provided, which may have a plurality of holes, through which molten-on plastic material may permeate, so that a direct connection between the pipe and the bushing may be created in the regions of the holes.

A direct welded connection between pipe and bushing may also be achieved by a heating means, which may have a plurality of inductively heatable ferromagnetic or ferrimagnetic particles. These may be integrated in the pipe and/or in the bushing. Alternatively or in combination, these particles may also be integrated within a plastic ribbon, which may be located between the pipe and the bushing. If, in a preferred manner, the plastic material of the plastic ribbon is the same as the plastic material of the pipe and/or bushing, then a materially particularly homogeneous and thus stable welded connection may be produced.

According to a further embodiment example of the invention, the method further has (a), prior to the laying alongside of the heating device, an axial bringing together of the pipe with a further pipe, so that an end of the pipe and an end of the further pipe face each other frontally (or on their face sides); (b) a laying alongside of the heating means at least partially circumferentially around the end of the pipe and the end of the further pipe; and (c) a slipping over (or sheathing) of the bushing around the heating means that is laid alongside.

The axial bringing together of the two pipes and/or pipe ends may be effected such that the two pipe ends abut against each other. Alternatively, also a small distance between the two pipe ends may be given.

The slipping over of the bushing can preferably be effected such that, prior to the bringing together of the two pipes, the bushing may be slided on one of the two pipes, and that, after the bringing together, the bushing may be shifted to the desired (axial) position.

According to a further embodiment example of the invention, the two pipes may be district heating pipelines, which may have in particular an outer pipe made of plastic and an inner pipe made of plastic or steel. Particularly preferred, a heat insulating material may be located between the inner pipe and the outer pipe. Optionally, the district heating pipeline may also have a metal diffusion barrier in the form of a film (or sheet), which may be located between the inner steel pipe and the outer plastic pipe.

According to a further embodiment example of the invention, the coil arrangement may be electrically embodied such that, and/or the coils of the coil arrangement may be excited such that, a current flow completely around the bushing along the complete circumferential course around the bushing may be prevented. By a selective (or targeted) interruption of the current flow along the circumferential direction, it may be prevented in a simple manner that a larger coil may form in the coil arrangement in addition to the first, to the second and as the case may be also in addition to the at least one further coil, which [larger coil] may generate an electromagnetic radiation that may have a comparably large penetration depth into the interior of the pipe and thus may reduce the advantage of the low penetration depth of the electromagnetic radiation generated by the individual coils.

A preventing and/or an interrupting of the current flow completely around the bushing may be achieved, for example, in that there may be no winding or other electrical conduit, which may run completely around the whole bushing, in the coil arrangement. By a suitable spatial distribution of the individual coils (not completely) around the bushing, the region that may be flown through by the inductive alternating field may be concentrated optimally on the zone to be heated for the welding.

According to a further embodiment example of the invention, the heating means may have a ribbon-type structure having an auxiliary heating material, which may be inductively heatable, wherein the auxiliary heating material may be distributed or arranged spatially along the circumferential course such that an electrical conductivity may be interrupted at at least one position along the complete circumferential course around the pipe.

By a selective interruption of the current flow along the circumferential direction, it may be prevented in a simple manner that a short-circuit winding may result around the pipe, which [winding] would result in an induced current flow around the whole pipe during an induction welding process. In the case of a closed and/or non-interrupted conductive heating means, such an induced current flow may result from the principle of a transformer, wherein a coil of the induction generator may represent the primary coil of the transformer, and the non-interrupted conductive heating means may represent the secondary coil of the transformer.

In this relation, it has been recognized that a directed current, which may occur only for a non-interrupted conductive heating means, may result in an asymmetry of the total current flow, which in turn may result in an inhomogeneous warming of the heating means. An asymmetry (of the direction) of the current flow in the heating means, which current flow may be responsible for the warming, may result in the case of a closed conductive heating ribbon from the fact, that upon an inductive excitation of the heating ribbon basically two types of currents may form. A first type may be the current, which may flow around the whole inner pipe due to the property of the heating means as a secondary winding of a transformer, and which may also be referred to in this document as a short-circuit current. The short-circuit current may flow exclusively or at least strongly preferred in the circumferential direction. The second type of current may be the so-called eddy currents, which may form in the heating means being an electric conductor due to the time-variable exciting magnetic field, which in turn may be generated by the coil arrangement. The eddy currents may generally have no particular preferential directions, and thus may result in a particularly homogeneous inductive generation of heat. By the preventing of short-circuit currents, precisely that part of the current, which may be responsible for the warming up, may be prevented, which current part may be asymmetrical with respect to the current direction. Thereby, the homogeneity of the warming up (or heating) may be improved overall, and local overheatings in the plastic to be liquefied may be avoided in a simple and effective manner in a welding process.

The circumferential direction, which may be defined at each point of the heating means by the circumferential course, may also be referred to in this document as tangential direction. A direction perpendicular to the circumferential direction and/or to the plurality of tangential directions may be referred to in this document as the longitudinal direction or as the axial direction.

Stated demonstratively, by the at least one electrical interruption of the heating means, it may be ensured that the heating means itself may not form a complete secondary winding around the pipe. Thereby, short-circuit currents may be prevented, and the heating and/or warming up of the heating means may be effected exclusively based on inductively generated eddy currents. Thereby, local overheatings in individual hotspots may be avoided in the welding process. Furthermore, the mounting of the heating means and/or the laying alongside of the heating means around the pipe may be simplified, and the whole handling of an inductive welding process may be simplified (or facilitated).

According to a further embodiment example of the invention, the heating means may have a ferromagnetic material, which may be inductively heatable, and which may have a Curie temperature that may be lower than 460° C., in particular lower than 400° C., further in particular lower than 300° C., and still further in particular lower than 250° C.

By the use of a ferromagnetic material having a Curie temperature that may be suitable in relation to the material of the two objects to be connected together, an automatic temperature limitation may be effected in a welding process. A stable, self-controlled welding process may be ensured by a Curie temperature, which may be sufficiently high on the one hand in order to melt the plastic material of the pipe and/or the bushing, and which may not be so high on the other hand that the plastic material may be brought to a temperature that may result in a thermal destruction. Such a thermal destruction may, for example, be given in that the plastic material melts on to such an extent that its form (or shape) may change not insignificantly during the thermal connection process. In particular, the ferromagnetic material should have a Curie temperature, which, insofar as this Curie temperature may be reached in a thermal connection process, may result only in a melting-on of a surface layer of the plastic material within a typical time period that may be required for a thermal connection process.

The expression "material" may be understood in this document to refer to both to a "uniform" material having a uniform "Curie temperature" and also to a material compound or plural material compounds of a composition of different materials. In particular, the expression "material" may relate to at least one single compound (or substance) (e.g. at least one alloy compound) or to a material composition (e.g. alloy).

It is pointed out that the heating described in this document may be caused in part by magnetic losses and in part by electric losses. Magnetic losses may be understood in this relation to be so-called cycling magnetization losses (or losses due to reversal of magnetism) in the heating means, which may be associated with the ferromagnetic magnetizability of the heating means, and which may also be referred to as hysteresis losses. The electrical losses may be in particular ohmic losses in connection with induced currents, in particular eddy currents, which may be generated in the inductive interaction of the heating means with an electromagnetic field that may be generated by an according generator.

Upon reaching the Curie temperature of the heating means, the cycling magnetization losses may cease to exist and the coupling-in of electromagnetic energy into the heating means may be reduced accordingly, because only the electrical losses may contribute to a (further) warming of the heating means. As a function of the concrete embodiment (or design) of the heating means, this ceasing to exist of the energy input caused by the cyclic magnetization losses may already be sufficient for a temperature limitation. As the case may be, an according reduction of the coupling-in of energy may be recognized also from the generator or from a frequency measurement device, which may detect the resonance frequency of an oscillator circuit (as described above).

A Curie temperature significantly above the melting point of the involved plastic materials may contribute to a quick heating during the welding process, and thus may facilitate a reduction in working hours for the welding process. In the case of a relatively high Curie temperature, the heating means may have to be optimized in relation to heat dissipation, heat capacity and heating rate to that effect that the energy, which may accumulate quickly in the heating means, may be dissipated to the plastic material such that this may not be damaged. As is described in detail in the following, by the use of materials having different Curie temperatures, the macroscopically occurring transition region of the loss of the ferromagnetic properties may be spread (and/or shifted), and thus the function of the temperature limitation may be configured additionally.

Different Curie temperatures of a heating means having plural ferromagnetic materials may have the advantage that, by a suitable mixture of the proportions (mass or volume proportions) of the different ferromagnetic materials, an average Curie temperature, which may be optimum for the respective application, may be adjusted. The described different ferromagnetic materials may also result in that at least two different Curie temperatures may be associated to the heating means. This may mean in practice that at the beginning of a welding process, when the temperature of the heating means and of the surrounding plastic material may still be relatively low, both materials may contribute to an inductive heating with a comparably high heating power. When the temperature may later reach a value, which may lie above the Curie temperature of that material, which may have the lower Curie temperature, then the heating process may take place only with a comparably low heating power. This may enable in an advantageous manner a particularly precise automatic control of the thermal connecting of the two objects pipe and bushing.

A heating means having different (ferromagnetic) materials may be realized simply by means of a structure in layers (or layer-wise composition) of different materials. Alternatively to, or in combination with, different Curie temperatures, these materials may have a different hardness, a different elasticity and/or a different ductility.

By a suitable adjustment of the proportions of the different materials, it may thus be possible to modify the mechanical stretching properties of the heating means, such that upon stretching there may selectively result deformations, which may contribute to an improvement, i.e. to an increased mechanical stability, of the produced welded connection. According to present insight, in particular a combination of two or more layers of the following metallic alloys may be suitable for the described layer-wise composition: Cu—Al, Fe—Cu, Fe-stainless steel, Cu—Sn, Fe—Al, Al—Mg. In order to achieve the optimum mechanical stretching properties for the respective application, it may also be possible to adapt, within an alloy, the ratios between the metals participating in the alloy.

In order to investigate the influence of different elasticities on the quality and in particular on the stability of a welded connection, a series of experiments has been carried out by the inventors. It has appeared thereby, that by a selective (or targeted) adjustment of the longitudinal elasticity of the heating means, a significant improvement of the welding result may be achieved. Herein, the longitudinal elasticity may be the elasticity of the heating means along its longitudinal extension, which may act along the surface of the inner pipe. Stated demonstratively, this elongated extension may be the tangential direction along the cylindrical lateral surface area of the pipe.

According to a further embodiment example of the invention, the first coil and the second coil may be excited offset relative to each other in time. This may be of advantage in particular, when the two coils overlap partially, as has been described above in relation to preferred embodiment examples. Thereby, the mutual magnetic influence between the two coils may be reduced. Also, this may contribute to a reduction of the magnetic penetration depth.

In the case of (significantly) more than two individual coils, these may also be interconnected and/or controlled in two or more groups, which may allow, specifically for mutually overlapping individual coils, to minimize the mutual influence and at the same time to nevertheless heat sufficiently the edge zones of the transitions between different coils.

According to a further embodiment example of the invention, the coil arrangement may be excited with a frequency between 100 Hz and 10 MHz, preferably between 1 kHz and 1 MHz, and particularly preferably between 20 kHz and 300 kHz.

As has been explained already above, according to the invention, plural comparably small coils may be used in order to pervade (or flood) with electromagnetic radiation a spatial region that may be relatively large in terms of area. Due to the comparably small inductivity of the coils, in comparison to known heating devices, excitation frequencies in a wide frequency range may be used. Thus, it may be possible to use a suitable excitation frequency, respectively, for different applications and in particular for different heating means.

According to a further embodiment example of the invention, the method further may have a laying alongside (or mounting) a tensioning device from the outside to the bushing, such that the latter may be subjected to a pressure that is at least approximately constant along its outer circumference. This may mean that the spatial region, in which the inductive welding may occur, may be put under pressure. In particular when plastic material may liquefy at the inner side of the outer bushing, this pressure may be transferred also to the outer side of the inner pipe. Thereby, particularly stable welded joints may be realized.

Preferably, the tensioning device may be laid alongside directly around the bushing prior to the mounting of the heating device. A common laying alongside of the tensioning device and the heating device may also be possible, as long as the tensioning device is integrated in the heating device. Both of this may mean that the heating device may not be mounted directly, but only indirectly to the bushing. Alternatively, the tensioning device may also be laid alongside onto the heating device from the outside. Also in this case it may be possible that the tensioning device may be integrated in the heating device for the purpose of an easy handling.

The tensioning device may be, for example, a ribbon, e.g. made of Teflon, which is wound around the bushing from the outside. Tightening straps having a tension lever or a ratchet tensioner may also be used.

Since the objects to be welded together and described herein may concern symmetrical cylindrical outer shells of pipes, a plastic layer, which may be located further internally (or further inside) and may not yet be softened (or macerated), may be sufficient in order to absorb completely the additional pressure applied from the outside. This may be of high importance in particular in the case of metallic diffusion barrier layers, which may be lying at the bottom. If the latter would nevertheless be heated by scatter fields, the pressure-supported welding together would arise preferably in the outer zone, and would cause no change further inside.

It is pointed out that embodiments of the invention have been described with reference to different invention subjects. In particular, some embodiments of the invention are described by device claims and other embodiments of the invention are described by method claims. However, the skilled person will understand immediately upon reading this application, that, unless it is not explicitly stated differently, in addition to a combination of features, which belong to one type of invention subject, also an arbitrary combination of features, which belong to different types of invention subjects, is possible.

Before exemplary embodiment examples of the invention are described with reference to the drawings, some technical considerations in connection with the invention are set forth in the following.

Further advantages and features of the present invention follow from the following exemplary description of presently preferred embodiments. The individual figures of the drawings of this document are to be considered only as schematically, and not as according to scale.

DETAILED DESCRIPTION OF ILLUSTRATED EMBODIMENTS

It is pointed out that in the following detailed description, features and/or components of different embodiments, which are equal or at least functionally equal to the corresponding features and/or components of another embodiment, are provided with the same reference numerals or with reference numerals, which are identical in the last two digits to the reference numerals of corresponding equal or at least functionally equal features and/or components. For avoiding unnecessary repetitions, features and/or components, which have been explained already with reference to a previously described embodiment, are not explained any more in detail later.

Furthermore, it is pointed out that the subsequently described embodiments represent only a limited selection of embodiment variants of the invention. In particular, it is possible to combine the features of individual embodiments with each other in a suitable manner, so that a plurality of different embodiments are to be considered as obviously disclosed for the skilled person with the embodiment variants illustrated explicitly herein.

In addition, it is pointed out that space-related terms, such as for example "in front" and "behind", "at the top" and "at the bottom", "left" and "right", etc. are used to describe the relation of an element to another element or to other elements such as it is illustrated in the figures. Accordingly, the space-related terms may apply for orientations, which differ from the orientations that are represented in the figures. It is however understood by itself that all such space-related terms, for the reason of simplicity of the description, relate to the orientations represented in the drawings and are not necessarily limiting, because the respective illustrated device, component, etc., when it is in use, may assume orientations, which may be different from the orientations illustrated in the drawings.

Figure 1:
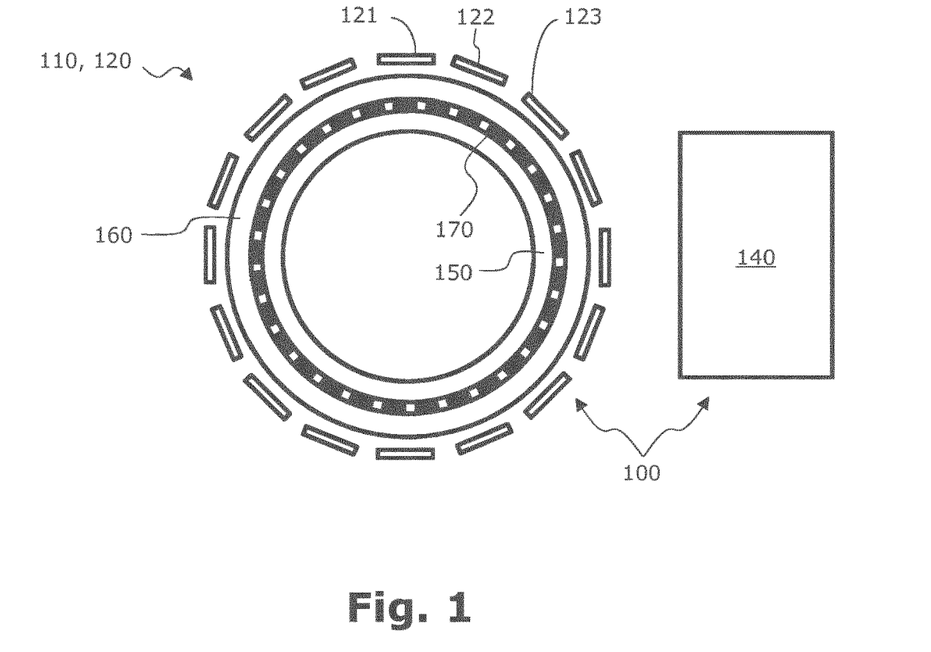
FIG. 1 shows a heating system having (a) a heating device having a coil arrangement, and (b) an induction generator for selective and targeted excitation of individual coils of the coil arrangement in order to inductively weld an inner pipe to an outer bushing.

FIG. 1 shows, in a cross-sectional view, a heating system 100 for inductively thermally connecting and/or welding together of an inner pipe 150, which may have a first plastic material, to an outer bushing 160, which may have a second plastic material, and which may surround at least a section of the pipe 150. An inductively heatable heating means 170 may be located between the pipe 150 and the bushing 160.

The heating system 100 may comprise a heating device 110 having a coil arrangement 120 and having an induction generator 140, which may also be referred to in this document simply as generator 140. The coil arrangement 120 may have a plurality of individual coils, a first coil 121, a second coil 122, and plural further coils 123. The generator 140 may be electrically coupled to the coil arrangement 120, and may be configured such that it may excite the coil arrangement 120 with an electrical alternating current.

The individual coils may have a relatively small cross-section in comparison to coils of known heating devices. Due to the comparably small coil cross-section, the magnetic field lines, which may emerge at both axial sides out of the respective interior of the coil and/or enter into the respective interior of the coil, may inflect (or bend) stronger than for a coil having a larger cross-section for the purpose of the formation of closed magnetic field lines as required by physics. Therewith, a particularly small magnetic penetration depth into the interior of the plastic pipe 150 may result in comparison to coils having larger coil cross-sections. For this reason, also pipes, which may have inductively heatable components, such as for example a metallic inner pipe, in the interior of a plastic shell, may be welded together by the described heating system 100. Something similar may hold for metallic films (or sheets), which may be used as a diffusion barrier in plastic casing pipes that may be used as district heating pipelines.

The individual coils may be interconnected in series or in parallel to each other. A combination of series and parallel interconnection(s) is also possible. Moreover, at least one individual coil can be excited individually independently from the other coils. In this case, the generator 140 has at least two pairs of output terminals, which are associated to different coils. The generator 140 may then be configured to excite and/or to feed with current different coils offset relative to each other in time.

As can be seen from FIG. 1, according to the embodiment example represented here, the heating means 170 may be wound completely around the pipe 150, such that an overlap (not represented) may result between the two ends of the heating means 170. Consequently, the heating means 170 may be considered as a short-circuited secondary coil of a transformer, the primary coil of which may represent the coil arrangement 120. Due to this short-circuited secondary coil, a current flow having a preferential direction may arise in the heating means 170, which preferential direction may run around the outer circumference of the pipe 150. Even if eddy currents, which may have no preferential direction at least in an average over time and thus provide a spatially homogeneous inductive heating, may be generated in the heating means 170 due to the inductive excitation, a current flow along and/or in the short-circuited secondary coil may result at least in a certain asymmetry (of the direction) of the current flow that may be responsible for the inductive heating, and thus in a not totally uniform heating of the heating means 170.

Stated demonstratively and in detail, this asymmetry may be described as follows: Upon an inductive excitation of a closed (conductive) heating means, basically two types of currents may show up. The first type may be the current, which may flow around the whole pipe 150 due to the property of the heating means as a secondary winding of the transformer, and which may also be referred to in this document as short-circuit current. The short-circuit current may flow exclusively or at least strongly preferred in the circumferential and/or tangential direction. The second type of current may be so-called eddy currents, which may be generated during the induction welding in a known manner in the heating means being an electric conductor, due to the exciting magnetic field that may vary in time, which exciting magnetic field may in turn be generated by the coil of the induction generator 140. The eddy currents may have generally no particular preferential directions and consequently may result in a particularly homogeneous inductive heat development. Thus, by the preventing of short-circuit currents, precisely that part of the current may be prevented, which may be responsible for the warming up, and which may be asymmetric in relation to the current direction. Thereby, the homogeneity of the heating is improved overall, and local overheatings in the plastic to be liquefied may be avoided during a welding process in a simple and effective manner.

In this connection it is pointed out that the heating described in this document may be caused in part by magnetic losses and in part by electrical losses. "Magnetic losses" are understood to be so-called cyclic magnetization losses (or losses due to reversal of magnetism) in the heating means, which may be associated to the ferromagnetic and/or ferrimagnetic magnetizability of the heating means, and which may also be referred to as hysteresis losses. The "electrical losses" may in be particular ohmic losses in connection with the mentioned eddy currents, which may be generated during the inductive interaction of the heating means with an electromagnetic field produced by a corresponding generator.

In order to prevent the secondary-sided short-circuit currents described above in particular for the purpose of a spatially uniform inductive heating of the heating means 170, according to the embodiment example illustrated here, the heating means 170 may be no continuously electrically conducting material. Rather, the heating means may consist of a non-conductive matrix material, preferably made of a plastic material, in which ferromagnetic particles may be embedded electrically isolated from each other.

Figure 2:
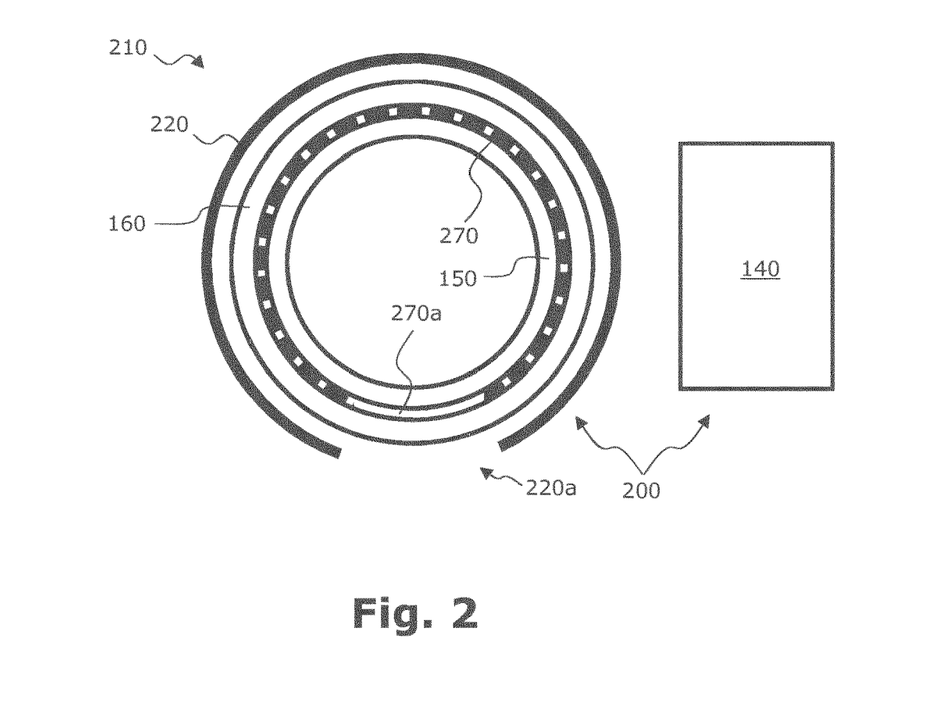
FIG. 2 shows a heating system having (a) a heating device having an open and/or interrupted coil arrangement, and (b) an induction generator for excitation of individual coils of the coil arrangement, such that an open and/or interrupted heating means, which is located outside of an inner pipe and inside of an outer bushing, is heated inductively.

FIG. 2 shows, in a cross-sectional view, a heating system 200, which has a heating device 210 and a generator 140. The heating device 210 may comprise a coil arrangement 220, which may have a plurality of individual coils that are not illustrated explicitly. According to the embodiment example set forth here, the coil arrangement 220 may not extend completely around the bushing 160 along the circumferential direction of the bushing 160. Stated differently, the coil arrangement 220 may have an interruption 220a. The same may hold for a heating means 270, which (i) may have a continuously electrically conducting and in particular ferromagnetic material, which (ii) may be located between the pipe 150 and the bushing 160, and which (iii) may have an interruption 270a. Thereby, a short-circuit current around the whole pipe 150 may be prevented in a simple and effective manner. In order to ensure an efficient inductive heating of the heating means 270 despite the two interruptions 220a and 270a, the two interruptions 220a and 270a may overlap along the circumferential direction of the pipe 150 and/or of the bushing 160.

Figure 3:
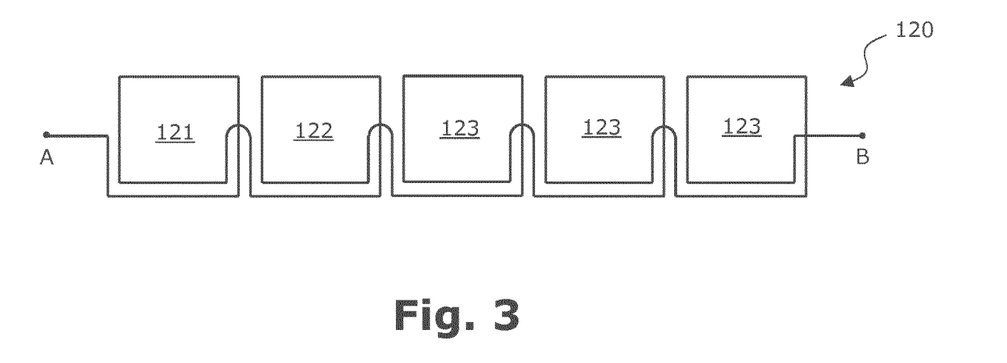
FIG. 3 shows a coil arrangement having plural coils interconnected in series.

FIG. 3 shows a coil arrangement 120 having plural coils interconnected in series, a first coil 121, a second coil 122 as well as plural (here: three) further coils 123. The illustrated linear arrangement of the coils 121, 122, 123 may extend between two connecting contacts A and B. Due to the pure serial interconnection, all coils 121, 122, 123 may be excited simultaneously by one single excitation signal, which may be applied at the two connecting contacts A and B.

It is pointed out that the two-dimensional representation of FIG. 3 shows the coil arrangement 120, which, in operation, may be arranged around the bushing and/or may lie against the cylindrical outer surface of the bushing, in a geometrical state that may be virtually rolled off from the bushing.

According to the embodiment example illustrated here, each coil 121, 122, 123 may have an at least approximately quadratic cross-section. In order to realize a linear arrangement of the coils 121, 122, 123, which may be electrically interconnected in a row and/or in series, each coil may have a natural number N of windings plus one half winding (N+½ windings) in the embodiment example represented here. For reasons of clarity, respectively, only one complete winding is illustrated in FIG. 3 in each case. As a function of the respective application, more, for example at least two, at least five or at least ten, complete windings may be provided. In this relation however it may have to be noted that with an increasing number of complete windings, the inductivity of the respective individual coil may increase, such that in practice the excitation frequency for the concerned individual coils may be bounded above (or limited in the upward direction).

It is pointed out that instead of quadratic or rectangular individual coils, also individual coils may be used, which may have a different cross-section. In particular, coils having an oval or even circular cross-section may appear suitable at present in order to achieve, on the one hand, an efficient inductive coupling to the respective heating means, and, on the other hand, a small penetration depth of the generated electromagnetic radiation.

Figure 4:
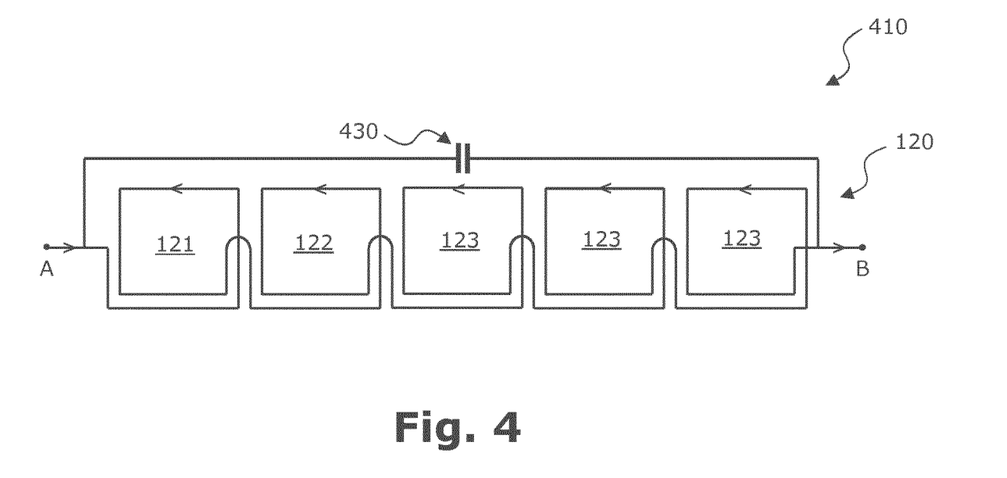
FIG. 4 shows a heating device, which has the coil arrangement of FIG. 3 as well as a capacitor interconnected parallel to the coil arrangement.

FIG. 4 shows a heating device 410, which may have the coil arrangement 120 of FIG. 3 as well as a capacitor 430 that may be interconnected parallel to the coil arrangement 120. The coil arrangement 120 and the capacitor 430 may form an electromagnetic oscillator circuit, the resonance frequency of which may reflect the actual (or present) inductivity of the coil arrangement 120. Therefore, conclusions on the actual inductivity of the coil arrangement 120 may be obtained by a measurement of the resonance frequency of the mentioned oscillator circuit already during an inductive welding process or directly before an inductive welding process, under the premise, which may be valid in a very good approximation, of a constant and known capacity of the capacitor 430.

The electrical properties of the heating means located in the vicinity of the coil arrangement 120, such as e.g. the capability to form eddy currents and/or its ferromagnetic properties, namely may change the inductivity of the individual coils and thus of the whole coil arrangement 120. Thereby, for example the correct mounting of the coil arrangement 120 around the bushing may be monitored.

As has been mentioned already above, by a measurement of a shifting of the resonance frequency, also conclusions on the actual temperature of the heating means and/or the reaching of a predetermined temperature of the heating means may be obtained. This may hold in particular for a temperature change of a ferromagnetic heating means up to its Curie temperature, which may not be yet reached at the beginning of an inductive welding process, but may be reached at least approximately in the course and/or towards the end of a welding process.

Figure 5:
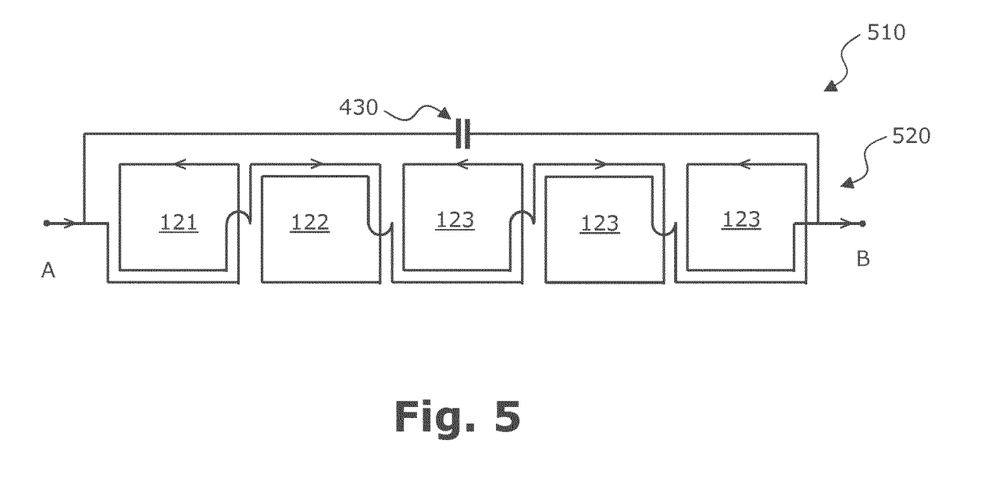
FIG. 5 shows a heating device having a coil arrangement, in which coils, which are interconnected in series and excited jointly, generate magnetic fields that are antiparallel to each other.

FIG. 5 shows a heating device 510 having a coil arrangement 520, which may have, in contrast to the coil arrangement 120 illustrated in FIG. 4, winding directions that may be different to each other. Different current directions may result thereby, which are represented in selected conductor sections respectively by an arrow head. The different winding directions may result in that the coils, which may be interconnected in series and excited jointly, may produce mutually antiparallel magnetic fields. Thereby, the penetration depth of electromagnetic radiation into the interior of a pipe may be reduced particularly strongly, because the magnetic field lines, which may be produced by a coil, may be canalized spatially by the other coil and/or are bundled (back) in a tight space.

Figure 6:
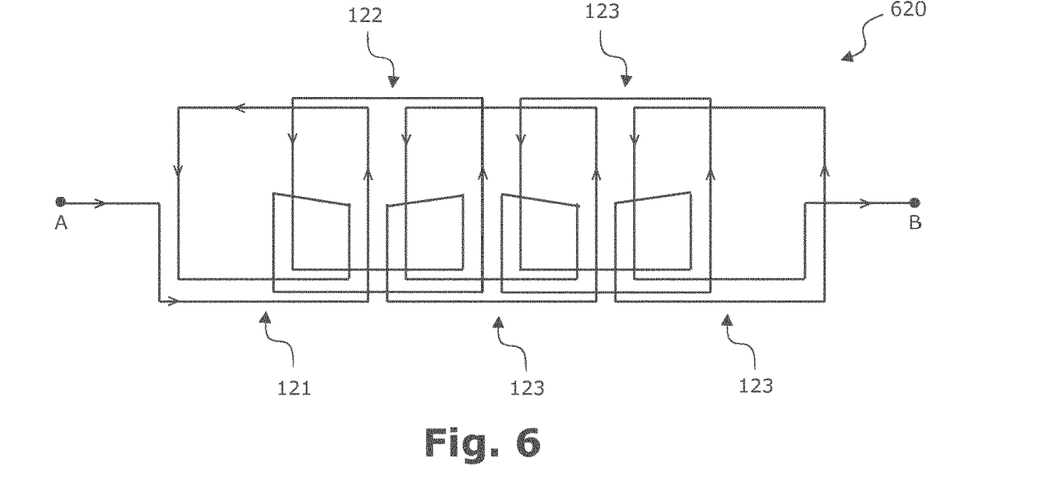
FIG. 6 shows a coil arrangement having plural coils, which are interconnected in series and overlap spatially.

FIG. 6 shows a coil arrangement 620 having plural individual coils 121, 122, 123, which may be interconnected in series and may overlap spatially. Thereby, an inhomogeneity of the produced magnetic field (between neighbouring, non-overlapping coils, the magnetic field strength may be lower) may be reduced in an advantageous manner.

Figure 7:
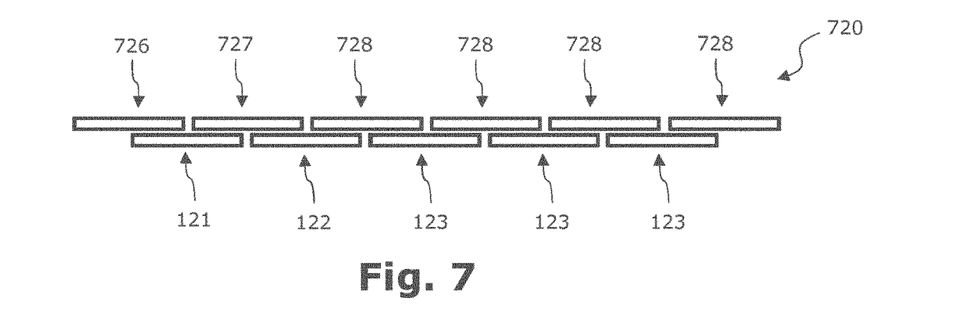
FIG. 7 shows a coil arrangement having two layers of coils lying on top of each other, wherein the two layers are oriented relative to each other such that the upper coils are offset relative to the lower coils.

FIG. 7 shows a coil arrangement 720 having two layers of coils lying upon each other. A layer of coils, which is at the bottom in FIG. 7, may have the coils 121, 122 and 123. The layer of coils, which is at the top in FIG. 7, may have a first outer coil 726, a second outer coil 727 as well as a further outer coils 728. As can be seen in FIG. 7, the two layers may be oriented relative to each other such that the upper coils 726, 727, 728 may be offset with respect to the lower coils 121, 122, 123. Thereby, as in the embodiment of FIG. 6, a spatial overlap may result between two individual coils that are neighbouring and associated to different layers of coils, which [overlap] may result in a significant improvement of the homogeneity of the generated magnetic field.

Figure 8:
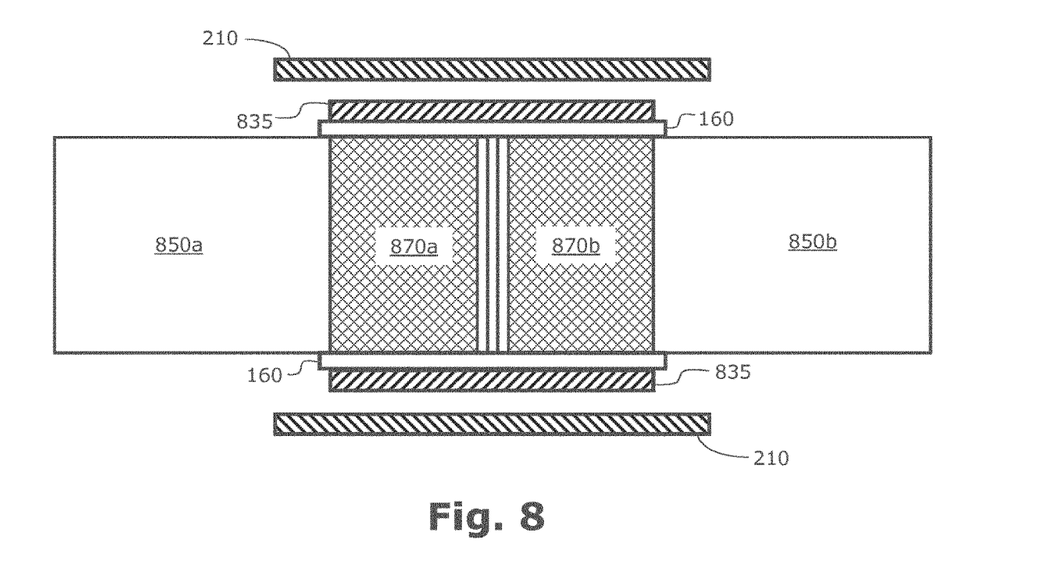
FIG. 8 illustrates an inductive welding together of two pipe sections, which are axially adjoining to each other, within a bushing.

FIG. 8 illustrates, in a schematic top view, an inductive welding together of two pipe sections axially adjoining to each other within a bushing. According to the embodiment example represented here, the two respective pipes may be so-called district heating pipelines, namely a first heating district pipeline 850a and a second heating district pipeline 850b. The two heating district pipelines 850a and 850b each may have an inner metallic core pipe as well as an outer plastic pipe, wherein a suitable thermal insulation material may be located between the inner core pipe and the outer plastic pipe.

As can be seen in FIG. 8, two heating means, a first heating means 870a and a second heating means 870b, may be located within a bushing 160. The first heating means 870a may be laid alongside around the end to be welded of the first heating district pipeline 850a and/or mounted (or laid alongside) to the latter. The second heating means 870b may be wound around the end to be welded of the second heating district pipeline 850b and/or mounted to the latter. The heating means 870a, 870b may preferably be structures, which are both materially closed and electrically interrupted around the pipes 850a, 850b, and which may have a matrix material as well as ferromagnetic particles that may be embedded therein and electrically isolated from each other. Alternatively, the heating means 870a, 870b may be structures, which may be both materially and electrically interrupted, and which may be described in more detail in the following. Combinations of materially closed structures and materially interrupted structures may also be used.

The quality of the welding of the two plastic district heating pipelines 850a and 850b may be improved in that the bushing 160 may be subjected to a pressure that may be at least approximately constant along the outer circumference of the bushing. For this reason, a mechanical tensioning device 835 may be provided between the heating device 210 and the bushing 160, by which [tensioning device] an according pressure may be created from the outside.

Figure 9A:
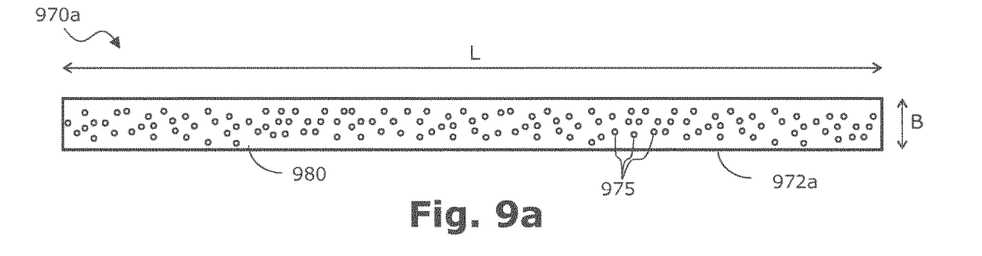
FIG. 9a shows, in a top view, a heating means having a plurality of openings, which are arranged irregularly in a ribbon-type structure.

FIG. 9a shows, in a top view, a heating means 970a, which may have a ribbon-type structure 972, in which a plurality of openings 975 may be formed. According to the embodiment example represented here, the openings 975 may be arranged in a spatially irregular manner. A regular spatial arrangement may however be also possible. The openings 975 may be created for example by punching and/or by a slitting and subsequent stretching of the material.

During a welding process, the openings 975 may enable a flowing through of molten-on plastic material through the ribbon-type structure 972. From this, a material connection of the plastic materials of the pipe and the bushing may result after a solidification, which in turn may result in an improved stability of the welded connection.

In preferred embodiment examples, a length L of the ribbon-type structure 972 may be in a range of 40 mm to 3200 mm, and in particular in a range from 60 mm to 800 mm. A typical relation between the length L and a width B of the ribbon-type structure 972 may be less than 1:10, in particular less than 1:100.

Figure 9B:
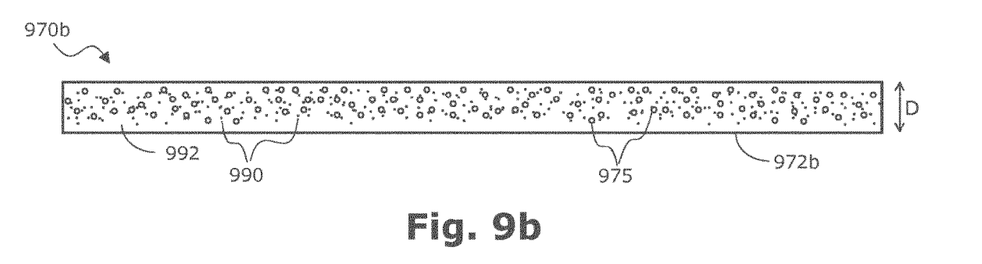
FIG. 9b shows, in a top view, a heating means, which has an electrically isolating matrix material and ferromagnetic particles embedded therein.

FIG. 9b shows, in a top view, a heating means 970b, which have an electrically isolating matrix material 992 and ferromagnetic particles 990 embedded therein. According to the embodiment example represented herein, the matrix material may consist of polyethylene (PE) or at least has this. The particles 990 may have an average size having a diameter of less than 1 mm, in particular less than 0.1 mm, and further in particular less than 0.01 mm. According to the embodiment example represented here, the particles may be ferrites.

The relatively small ferromagnetic particles 990 may have the advantage, that very high frequencies may be used for an inductive heating. In this relation, it may be of great importance that the penetration depth of the electromagnetic radiation into the interior of the respective pipe may decrease with increasing frequency.

The advantage of the possibility of the use of high frequencies may be exploited in particular by the afore-described composition of the coil arrangement in the form of a plurality of comparably small individual coils in order to produce the electromagnetic field that may be necessary for an inductive heating.

Figure 9C:
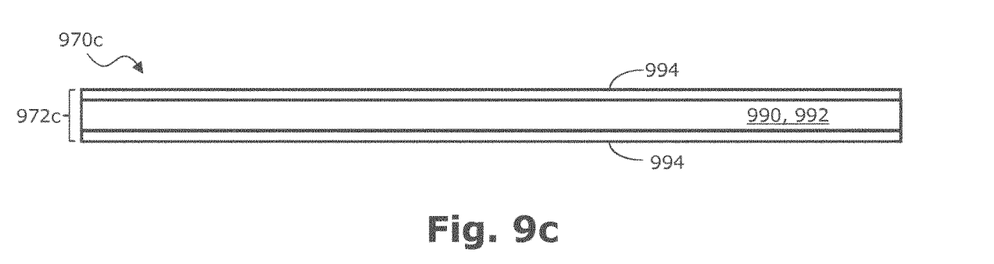
FIG. 9c shows, in a side view, a heating means having a ribbon-type structure, which has a matrix material having ferromagnetic particles embedded therein, and two flexible carrier elements formed as carrier films.

FIG. 9c shows, in a side view, a heating means 970c having a ribbon-type structure 972c, which may have a matrix material 992 having embedded ferromagnetic particles 990, and two flexible carrier elements 994 which are formed as carrier films (or sheets). The matrix material 992 may be located between the two carrier films 994. The carrier elements 994 may be films that may be provided with an adhesive agent, to which the matrix material 992 may adhere. Such a layer-wise structure of the heating means 970c may enable a particularly easy handling.

According to the embodiment example represented here, the heating means 970c constructed in layers may have a thickness D of 0.5 μm. However, also other thicknesses from 0.1 mm to 3 mm, in particular from 0.2 mm to 2 mm, and further in particular from 0.3 mm to 1 mm, may be used.

Figure 9D:
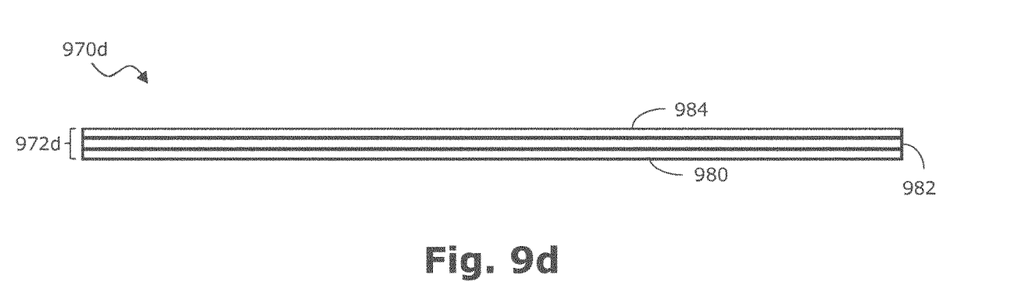
FIG. 9d shows, in a side view, a heating means, which has plural ferromagnetic layers, each of which have a different Curie temperature.

FIG. 9d shows, in a side view, a heating means 970d, which may have plural ferromagnetic layers, each of which may have a different Curie temperature. According to the embodiment example represented here, a ribbon-type structure 972d of the heating means 970d may have plural (here: three) layers, each of a different ferromagnetic material. A first layer may have a (first) ferromagnetic material 980 having a first Curie temperature. A second layer may have a second and/or further ferromagnetic material 982 having a second Curie temperature. The third layer may have a third and/or further ferromagnetic material 984 having a third Curie temperature. According to the embodiment example represented here, the three Curie temperatures may be different. Thus, an average Curie temperature of the heating means 970d may result, which may be adapted to the respective specific welding application by a suitable selection of the three ferromagnetic materials.

In other embodiments, no common average Curie temperature may form, so that an inductive energy input into the heating means 970d may be reduced, but not completely prevented, after a reaching of the lower Curie temperature. As a consequence, a slower temperature increase may result upon a same inductive excitation, wherein upon the reaching of the respective next higher Curie temperature, an inductive coupling between an excitation coil and the heating means 970d may be reduced.

In preferred embodiments, a thickness D of the heating means 970d may be in a range between 0.1 mm and 5 mm, and in particular in a range between 0.5 mm and 3 mm. These dimensions may hold also for a ribbon-type structure, which may consist of only one layer of a ferromagnetic material.

It is pointed out that layered heating means may also have 2, 4 or more layers.

It is further pointed out that the heating means 970d may have a surface roughness at its plane sides, i.e. in FIG. 9d at the upper surface and/or at the lower surface. Such a surface roughness may be based on elevations and recesses, which may have an average height difference to each other. In preferred embodiments, this average height difference may be greater than 10 μm. A surface roughness may result in improved welding results also for the other heating means described in this document.

It should be noted that the expression "having" (or "comprising") does not exclude other elements, and that the article "a" (or "an") does not exclude a plurality. Also, elements which are described in connection with different embodiment examples, may be combined.

REFERENCE NUMERALS 100 heating system
110 heating device
120 coil arrangement
121 first coil
122 second coil
123 further coil
140 generator
150 pipe
160 bushing
170 heating means
200 heating system
210 heating device
220 coil arrangement
220a interruption
270 heating means
270a interruption
A, B connections (or contacts)
410 heating device
430 capacitor
510 heating device
520 coil arrangement
620 coil arrangement
720 coil arrangement
726 first outer coil
727 second outer coil
728 further outer coil
835 tensioning device
850a first (district heating) pipeline
850b second (district heating) pipeline
870a first heating means
870b second heating means
970a/b heating means
970c/d heating means 972c/d ribbon-type structure
975 openings
980 ferromagnetic material
982 further ferromagnetic material
984 further ferromagnetic material
990 particles/ferrites
992 matrix material
994 carrier element/carrier film
L length
B width

The invention claimed is:

1. A heating system for thermally connecting a pipe, which has a first plastic material, to a bushing, which has a second plastic material, and which surrounds at least a section of the pipe wherein an inductively heatable heating means is located between the pipe and the bushing and/or integrated in the pipe and/or in the bushing, the heating system comprising:
    a generator;
    a heating device with a coil arrangement, which is excitable by the generator, and
    a tensioning device;
    wherein the coil arrangement has
        a first coil, which has at least one complete winding within a first cross-sectional area, and
        a second coil, which is electrically coupled to the first coil, and which has at least one complete winding within a second cross-sectional area, wherein the first cross-sectional area is different from the second cross-sectional area;
    wherein the tensioning device is configured to be laid alongside an outward facing surface of the bushing, such that the bushing is subjected to a pressure that is constant along an outer circumference of the bushing.

2. The heating system according to claim 1, wherein the first cross-sectional area and the second cross-sectional area have an overlap.

3. The heating system according to claim 1, wherein the two coils are mechanically connected flexibly to each other and/or have themselves at least a certain flexibility.

4. The heating system according to claim 1, wherein the two coils are electrically coupled to each other such that upon an excitation of the coil arrangement, a first magnetic field generated by the first coil is antiparallel to a second magnetic field generated by the second coil.

5. The heating system according to claim 1, wherein the first cross-sectional area and/or the second cross-sectional area is smaller than 1 m$^2$.

6. The heating system according to claim 1, wherein the first cross-sectional area and/or the second cross-sectional area have at least one of
    an oval shape,
    a circular shape,
    a triangular shape, and
    a quadrangular shape.

7. The heating system according to claim 1, further comprising:
    at least one further coil, which has at least one complete winding within a further cross-sectional area, wherein the further cross-sectional area is different from both the first cross-sectional area and the second cross-sectional area.

8. The heating system according to claim 1, wherein the coils are electrically interconnected in series and/or in parallel to each other.

9. The heating system according to claim 1, wherein the coil arrangement further has
    at least one outer coil, which is arranged above the first coil and/or above the second coil, wherein a cross-sectional area of the outer coil is, in a plane parallel to the plane of the first cross-sectional area and/or parallel to the plane of the second cross-sectional area, offset with respect to the first cross-sectional area and/or with respect to the second cross-sectional area.

10. The heating system according to claim 1, further comprising:
    a capacitive element, which, together with the coil arrangement, forms an oscillator circuit.

11. A method for thermally connecting a pipe, which has a first plastic material, to a bushing, which has a second plastic material, and which surrounds at least a section of the pipe, wherein an inductively heatable heating means is located between the pipe and the bushing and/or integrated in the pipe and/or the bushing, the method comprising:
    laying alongside a heating device to the bushing from an outside, the heating device including a coil arrangement, which is excitable by a generator, and which has a first coil, which has at least one complete winding within a first cross-sectional area, and a second coil, which is electrically coupled to the first coil, and which has at least one complete winding within a second cross-sectional area, wherein the first cross-sectional area is different from the second cross-sectional area;
    laying a tensioning device alongside an outward surface of the bushing, such that the bushing is subjected to a pressure that is constant along an outer circumference of the bushing;
    exciting the coil arrangement; and
    removing the heating device from the bushing.

12. The method according to claim 11, further comprising, prior to the applying the heating device,
    axially bringing together the pipe with a further pipe, such that an end of the pipe and an end of the further pipe face on their face sides;
    laying alongside at least partially circumferentially the heating means around the end of the pipe and the end of the further pipe; and
    slipping over the bushing around the heating means that is laid alongside.

13. The method according to claim 12, wherein the two pipes are district heating pipelines, which have an outer pipe made of plastic and an inner pipe made of plastic or steel.

14. The method according to claim 11, wherein the coil arrangement is embodied electrically such that, and/or the coils of the coil arrangement are excited such that, along the complete circumference course around the bushing, an electric current flow completely around the bushing is prevented.

15. The method according to claim 11, wherein the heating means has a ribbon-type structure having an auxiliary heating material which is inductively heatable, wherein the auxiliary heating material is spatially distributed or arranged such that, along the complete circumference course around the pipe, an electrical conductivity is interrupted at at least one position.

16. The method according to claim 11, wherein the heating means has a ferromagnetic material, which is inductively heatable, and which has a Curie temperature that is less than 460° C.

17. The method according to claim 11, wherein the first coil and the second coil are excited temporarily offset relative to each other.

18. The method according to claim 11, wherein the coil arrangement is excited with a frequency between 100 Hz and 10 MHz.

* * * * *